Figure 1:
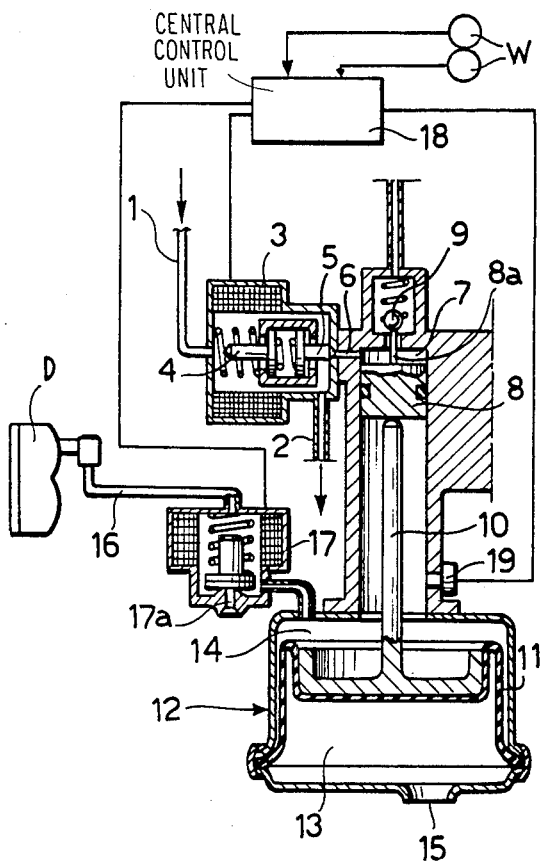

United States Patent [19]

Cotignoli

[11] Patent Number: 4,767,163

[45] Date of Patent: Aug. 30, 1988

[54] MOTOR VEHICLE BRAKING SYSTEM WITH A WHEEL ANTI-LOCKING FUNCTION WITH VACUUM SENSOR

[75] Inventor: Giuseppe Cotignoli, Collegno, Italy

[73] Assignee: Marelli Autronica S.p.A., Milan, Italy

[21] Appl. No.: 137,894

[22] Filed: Dec. 28, 1987

[30] Foreign Application Priority Data

Dec. 31, 1986 [IT] Italy ................ 67999 A/86

[51] Int. Cl.[4] .................. B60T 13/68; B60T 13/46
[52] U.S. Cl. ........................... 303/61; 303/12; 303/115; 303/116; 303/119; 303/DIG. 3; 303/100; 303/DIG. 4
[58] Field of Search .................. 303/61–63, 303/68–69, 12, 113–119, 100; 188/181, 356, DIG. 3, DIG. 4

[56] References Cited

U.S. PATENT DOCUMENTS

| | | | |
|---|---|---|---|
| 3,840,279 | 10/1974 | Pauwels | 303/12 X |
| 3,950,946 | 4/1976 | Sakai et al. | 303/12 X |
| 4,002,376 | 1/1977 | Kondo et al. | 303/115 |
| 4,168,867 | 9/1979 | Ando et al. | 303/115 |
| 4,170,066 | 10/1979 | Blomberg et al. | 303/115 X |
| 4,296,971 | 10/1981 | Nakazato | 303/115 |
| 4,311,980 | 1/1982 | Prudenziati | 338/4 |

*Primary Examiner*—Douglas C. Butler
*Attorney, Agent, or Firm*—Sughrue, Mion, Zinn, Macpeak and Seas

[57] ABSTRACT

In order to reapply the fluid operating pressure to the braking members of the wheels after an anti-locking operation has been carried out, a pumping device is provided which are driven by the subatmospheric pressure (vacuum) existing in the inlet manifold of the engine. The application of the braking pressure is controlled by a valve which receives an opening command signal consisting of a train of pulses from a control device. At least one vacuum sensor is provided which generates a monitoring signal indicative of the level of vacuum present in the inlet manifold. The control device causes opening of the valve with a command signal whose average is inversely proportional to the level of the monitoring signal generated by the vacuum sensor.

3 Claims, 2 Drawing Sheets

MOTOR VEHICLE BRAKING SYSTEM WITH A WHEEL ANTI-LOCKING FUNCTION WITH VACUUM SENSOR

DESCRIPTION

The present invention relates to motor vehicle braking systems with a wheel anti-locking function. In particular, the invention relates to a braking system in which, to reapply the fluid operating pressure to the braking members of the wheels after an anti-locking operation has been carried out, there are provided:

pumping means driven by the subatmospheric pressure (vacuum) existing in the inlet manifold of the engine of the motor vehicle, valve means interposed between the pumping means and the braking members, and a device for controlling the valve means, which can send to the valve means an opening command signal consisting of a train of pulses.

In use of current systems of the type specified above, even quite wide variations of the vacuum present in the inlet manifold of the engine of the motor vehicle may be encountered during vehicle braking phases with intervention of the anti-locking function (ABS).

For example, it is quite normal that, upon starting to brake the vehicle, the driver, as well as releasing the accelerator pedal (to cause closure of the throttle of the carburettor), also presses the clutch pedal, causing its disengagement.

As a result, there is a rapid increase in the rate of revolution of the engine which, together with the rapid closure of the throttle valve of the carburettor, produces a sudden increase in the vacuum present in the inlet manifold of the engine.

Subsequently, the rate of revolution of the engine decreases gradually towards the idling speed, causing a corresponding gradual change in the vacuum in the inlet manifold.

Usually, the pumping means which cause the gradual reapplication of the braking pressure after the inervention of the anti-locking function (ABS) actually operate in the presence of a rapid variation of the pressure (vacuum) which causes their operation.

As a result of all this, the intervention of the pumping means does not occur according to precisely determined criteria which can be repeated in any intervention condition, independently of the prevailing operating conditions of the engine of the motor vehicle, as one might wish.

The present invention has the object of providing a motor vehicle braking system with a wheel anti-locking function, of the type specified above, in which the disadvantages described above are wholly eliminated.

According to the present invention, this object is achieved by virtue of a braking system of the type specified above, characterised in that at least one vacuum sensor is provided which can generate a monitoring signal whose level is indicative of the subatmospheric pressure (vacuum) existing in the inlet manifold of the engine, and in that the control device is connected to the at least one sensor and can generate the opening command signal with a mean value which is inversely proportional to the level of the monitoring signal.

Preferably, the configuration of the control element is such as to vary the mean value of the opening command signal by variation of the frequency of repetition of the pulses, the pulses being of constant duration.

Figure 3:
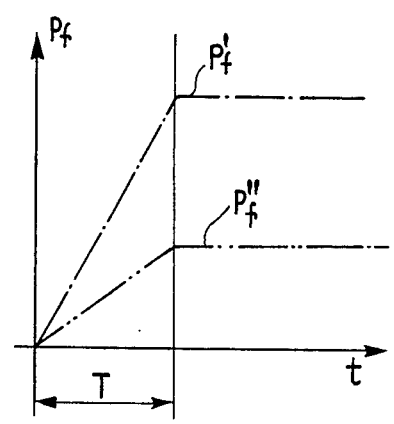
Figure 2:
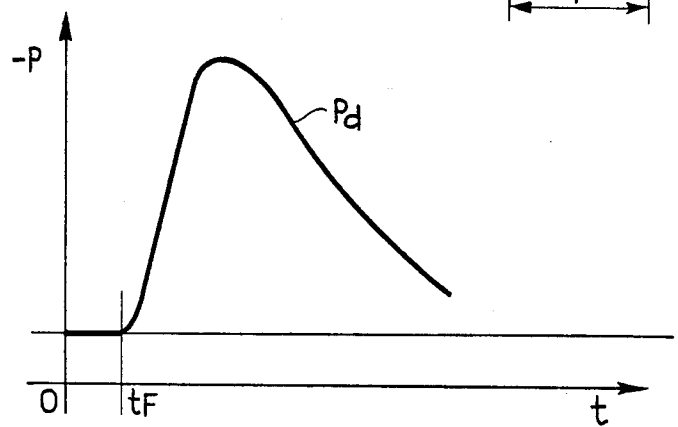

The invention will now be described, purely by way of non-limiting example, with reference to the appended drawings, in which:

FIG. 1 illustrates schematically the structure of a braking system to which the invention is applied, FIGS. 2 and 3 are two time graphs reproduced to assist a better understanding of the invention in the light of the problems explained above, and FIGS. 4 and 5 are another two time graphs which illustrate two different possible operating criteria of one of the elements illustrated in FIG. 1.

In FIG. 1 part of a motor vehicle braking system with a wheel anti-locking function is shown schematically.

As far as its general operating criteria are concerned, this is a braking system according to the prior art.

For this reason, the general operating criteria will be repeated below only in so far as this is necessary for an understanding of the invention.

In the diagram of FIG. 1, the inlet manifold of an internal combustion engine of a motor vehicle, not illustrated as a whole, is indicated D.

When the engine of the motor vehicle is running, there is a subatmospheric pressure (vacuum) $p_d$ in the manifold D, whose value is determined by various parameters. In the case of an internal combustion engine with controlled ignition and a suction carburettor, two parameters in particular assume notable prominence: the rate of revolution of the engine and the position of the throttle valve of the carburettor.

For example, when the driver brakes quite rapidly, the vacuum $p_d$ in the manifold D (that is, the difference -p between the pressure existing in the inlet manifold D and atmospheric pressure, taken as 0 on the scale) exhibits a variation with time of the type illustrated in the graph of FIG. 2. In this graph, the moment $t_F$ indicates the moment at which, according to current practice, the driver moves the clutch pedal downwards after having released the accelerator pedal. As a result of this manoeuvre, which frees the engine of the motor vehicle from the resistant load while the throttle valve of the carburettor is brought rapidly into the closed position, the vacuum $p_d$ increases suddenly until it reaches a maximum value and then decreases gradually as the rate of revolution of the engine drops.

With reference again to the diagram of FIG. 1, a duct, indicated 1, is connected to a source of pressurised braking fluid (not illustrated). Usually, this source consists of the master cylinder of the braking system of the motor vehicle and is subject to the action of the brake pedal operated by the driver. A duct (or an operatively equivalent network of ducts) through which the fluid operating pressure can be transmitted towards the braking members (not illustrated) associated with the wheels of the motor vehicle is indicated 2.

The passage of the pressurised operating fluid from the duct 1 to the duct or ducts 2 is controlled by a solenoid valve 3 or, more precisely, by a first obturator 4 of the valve.

A further obturator 5 of the solenoid valve 3 controls the passage of the fluid for operating the braking members through a further duct 6 communicating with a chamber 7 in which a piston 8 is sealingly slidable.

The piston 8 is provided with an appendage 8a which controls the opening and closure of a ball valve 9 (according to criteria not relevant to the understanding of the invention and therefore not described further).

Movement of the piston 8 within the chamber 7 is controlled by a thrust element 10 mounted on the diaphragm 11 of a barometric capsule 12 having first and second chambers indicated 13 and 14 respectively. The first chamber 13 communicates directly with the atmosphere through an opening 15, whilst the second chamber 14 communicates with the inlet manifold D through a duct 16 in which is interposed a solenoid valve 17 which, when energised, puts the chamber 14 into communication with the atmosphere through an opening 17a. A control device (central control unit) 18, usually consisting of a microprocessor, controls the opening and closure of the solenoid valves 3 and 17, according to criteria which will be explained below, in dependence on monitoring signals coming from sensors W associated with the wheels of the motor vehicle and able to detect the condition in which one or more of the wheels of the motor vehicle run the risk of locking and beginning to slide on the ground, and from a further sensor 19 mounted in a position facing the second chamber 14 of the barometric capsule 12.

The sensor 19, which may, for example, be of the type described in the U.S. Pat. No. 4,311,980, is therefore able to output a monitoring signal whose level is indicative of the vacuum present in the second chamber 14 of the capsule 12 in at least some phases of operation.

In other words, according to the terminology used in the claims which follow, the sensor 19 can generate (at least in some operating conditions of the system of FIG. 1) a monitoring signal indicative of the difference between the pressure (vacuum) existing in the inlet manifold D of the engine (to which the chamber 14 is connected through the duct 16) and the atmospheric pressure (present in the chamber 13 of the capsule 12).

The general operating criteria of the system of FIG. 1, which are known per se, will now be described briefly, with the omission for the moment of the function carried out by the sensor 19 constituting the specific subject of the present invention.

In normal running conditions of the motor vehicle (absence of braking), the solenoid valve 17 and the solenoid valve 3 are kept in the de-energised position.

This means that:

the vacuum in the manifold D is propagated freely towards the chamber 14 of the capsule 12 so that the thrust element 10 mounted on the diaphragm 11 is forced against the piston 8, thrusting it towards the ball valve 9 which is kept in the open position by the appendage 8a, and the obturator 4 is in the open position, allowing free communication between the duct 1 and the duct 2, while the other obturator 5 is in the closed position, blocking the duct 6.

In order to cause braking of the vehicle, the driver operates the brake pedal so that the fluid pressure generated by the master cyclinder of the system is propagated through the duct 1 and the solenoid valve 3 into the ducts 2 and through these to the braking elements of the wheels.

When the sensors W transmit a signal to the unit 18 indicating a tendency of a respective wheels to lock, the unit 18 causes energisation of the solenoid valve 17 whose obturator closes the arm of the duct 16 connected to the manifold D and puts the other arm of the same duct into communication with the opening 17a which opens to the atmosphere.

The chamber 14 of the capsule 12 is therefore brought to atmospheric pressure to establish a condition of equilibrium between the pressures in the two chambers 13 and 14 of the capsule 12.

At the same time, the device 18 causes closure of the obturator 4 of the solenoid valve 3, separating, so to speak, the braking members of the vehicle from the master cylinder (duct 1) and simultaneously opening the obturator 5. In these conditions, the pressurised braking liquid accumulated in the ducts 2 of the braking members can flow through the duct 6 into the chamber 7.

As there is no thrust exerted by the element 10 mounted on the diaphragm 11 (the two chambers 13, 14 separated by this diaphragm being, in fact, at the same pressure), the piston 8 moves without load, that is, substantially without resistance, away from the ball valve 9 which closes, allowing the braking fluid coming from the duct 2 to collect inside the chamber 7 whose volume gradually increases.

In this way, the effect of the release of the fluid operating pressure achieves anti-locking (ABS) of the wheels which were running the risk of locking and starting to slide on the ground.

As soon as the tachometric signal generator by the sensors W associated with the wheels which were at risk of locking indicates that the wheels in question are again rotating at a rate such as to ensure good road-holding, the device 18 re-establishes the conditions which allow recommencement of the braking of the wheels.

For this purpose, the device 18 causes the solenoid valve 17 to be de-energised again, reconnecting the chamber 14 of the capsule 12 with the inlet manifold D.

The vacuum thus returns to the chamber 14 so that, because of the difference which is established with the chamber 13 in contact with the atmosphere, the thrust element 10 and thus the piston 8 are once again forced towards the ball valve 9, causing a reduction in the volume of the chamber 7.

The braking fluid collected in this chamber, therefore, tends to be pumped out of the chamber by the action of the cylinder 8.

During this phase of operation, the device 18 sends a command signal consisting of a train of pulses to the solenoid valve 3 to cause rhythmic opening of the obturator 5, with resulting pulsed reapplication of the operating pressure to the braking members connected to the duct 2.

Thus, in this phase of operation (reapplication of braking) the piston 8 acts as pumping means operated by the vacuum present in the manifold D.

It can immediately be seen that, for the same duration T of the command pulses applied by the device 18 to the solenoid valve 3 to cause the obturator 5 to open, the value of the fluid pressure transmitted towards the braking members through the duct 2 can vary significantly in dependence on the level of vacuum present in the chamber 14 and hence in the inlet manifold D.

The graph of FIG. 3 shows, purely qualitatively, the difference between the increase in braking pressure $p_f$ which can be applied to the braking members when the vacuum in the manifold D is near the maximum value in the graph of FIG. 2 (chain line $p_f'$) and the increase in pressure which, on the other hand, can be established when the vacuum has dropped towards its minimum values in the graph of FIG. 2 (broken line and two dots $p_f''$), for an equal duration T of an opening interval of the obturator 5.

As a result, the command of the opening of the obturator 5 by a signal consisting of a train of pulses of duration T and a constant period or frequency of repetition causes the system, during re-application of the brakes, to operate in a manner which cannot be clearly predetermined and which is affected by the prevailing operating conditions of the engine of the vehicle.

In the solution according to the invention, the sensor 19 provides the device 18 with a signal whose level is indicative of the prevailing value of the vacuum present in the chamber 14 connected to the manifold D. The value of this vacuum, that is, the difference between the value of the pressure existing in the manifold D and in the chamber 14 and atmospheric pressure (chamber 13), determines the force with which the thrust element 10 acts on the piston 8 and consequently the pressure which is applied to the fluid which is caused to flow again to the braking members through the ducts 6 and 2.

Figure 4:
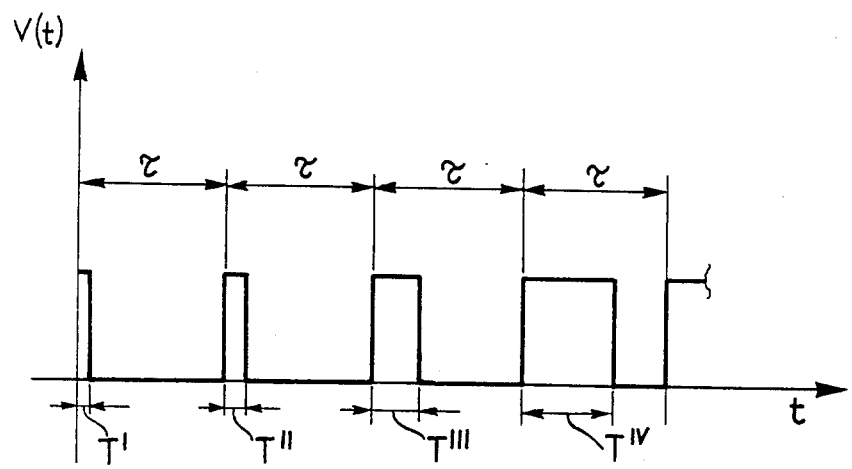
Figure 5:
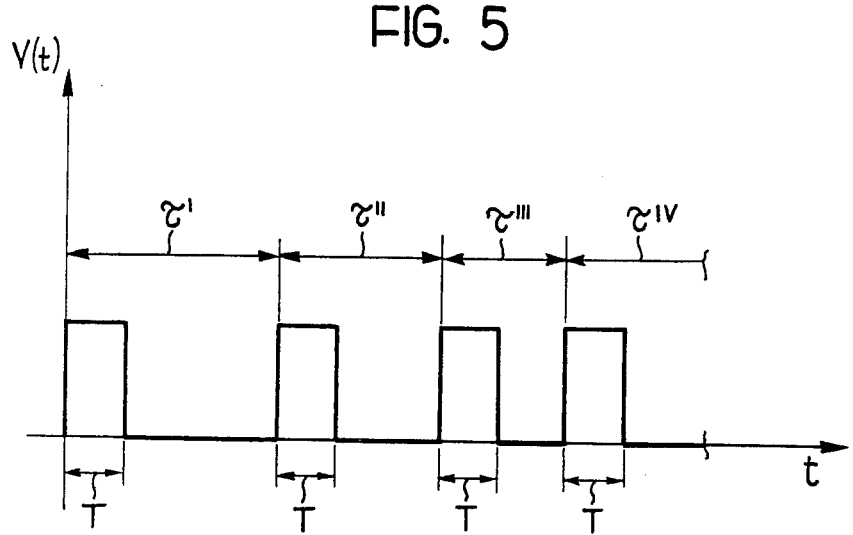

In the system according to the invention, the configuration of the device 18 is such that the pulsed signal v(t) which causes opening of the obturator 5 during the phase of reapplication of the brakes has pulses which are not of constant duration, period or frequency of repetition but are in accordance with two possible variants, to which FIGS. 4 and 5 refer:

constant period $\tau$ (and therefore frequency) of repetition with durations $T^i$, $T^{ii}$, $T^{iii}$, $T^{iv}$ of the opening intervals of the obturator variable inversely with the level of vacuum $p_d$ monitored by the sensor 19 (FIG. 4), constant duration T of the pulses with periods of repetition $\tau^i$, $\tau^{ii}$, $\tau^{iii}$, $\tau^{iv}$ inversely proportional to the vacuum pd (FIG. 5).

In other words, when the operating pressure which acts on the thrust element 10 and on the piston 8 is high, the opening intervals of the obturator 5 are reduced to a minimum and then increased (either by increased duration of each opening interval repeated with a constant frequency—FIG. 4—or by increased frequency of repetition of the opening intervals of constant duration T—FIG. 5) as the vacuum $p_d$ gradually decreases.

In general, it can be stated that the law of intervention of the device 18 of the system according to the invention can be expressed as a relationship of the type $$v_m \propto \frac{K}{p_d - p_o} \quad (I)$$

where $v_m$ represents the mean value of the train of pulses v(t) which control the opening of the obturator 5, and can be defined by a relationship of the type $$v_m = \frac{1}{\theta} \int_0^\theta V(t)dt \text{ and} \quad (II)$$

where k and $p_o$ are two reference constants definable experimentally in dependence on the characteristics of the particular system.

In other words, in the system according to the invention, the opening command signals for the obturator 5 has a mean value which is inversely proportional to the level of the monitoring signal produced by the sensor 19.

Naturally, the expression inversely proportional is not intended to be limited to straightforward inverse proportionality, but also includes more complex functions definable experimentally with the basic objective of making the gradual reapplication of operating pressure to the braking members wholly independent of fluctuations in the vacuum $p_d$ which controls the movement of the thrust element 10 and the piston 8.

Naturally, the principle of the invention remaining the same, the details of realisation and forms of embodiment can be varied widely with respect to those described and illustrated, without thereby departing from the scope of the present invention.

I claim:

1. A motor vehicle braking system with a wheel anti-locking function, in which, to re-apply the fluid operating pressure to the braking members of the wheels after an anti-locking operation has been carried out, there are provided:

pumping means driven by the subatmospheric pressure existing in the inlet manifold of the engine of the motor vehicle, valve means interposed between the pumping means and the braking members, and a device for controlling the valve means which can send to the valve means an opening command signal consisting of a train of pulses, wherein at least one vacuum sensor is provided for generating a monitoring signal whose level is indicative of the subatmospheric pressure existing in the inlet manifold of the engine, and said control device is connected to the at least one sensor to generate the opening command signal with a mean value ($v_m$) which is inversely proportional to the level of the monitoring signal.

2. A system according to claim 1, wherein said control device varies the mean value ($v_m$) of the opening command signal by variation of the frequency of repetition of the pulses, the pulses being of constant duration.

3. A system according to claim 1, wherein said control device varies the mean value of the opening command signal by variation of the duration of the pulses, the pulses having a constant frequency of repetition.

* * * * *